United States Patent [19]

Idel et al.

[11] Patent Number: 5,288,848

[45] Date of Patent: * Feb. 22, 1994

[54] PROCESS FOR PREPARATION OF HIGH MOLECULAR WEIGHT, OPTIONALLY BRANCHED POLYARYLENE SULPHIDES

[75] Inventors: Karsten Idel; Wolfgang Ebert; Ludwig Bottenbruch; Dieter Freitag; Rolf-Volker Meyer, all of Krefeld, Fed. Rep. of Germany

[73] Assignee: Bayer Aktiengesellschaft, Leverkusen, Fed. Rep. of Germany

[*] Notice: The portion of the term of this patent subsequent to Jul. 26, 2005 has been disclaimed.

[21] Appl. No.: 978,174

[22] Filed: Nov. 17, 1992

Related U.S. Application Data

[63] Continuation of Ser. No. 494,782, Mar. 12, 1990, abandoned, which is a continuation of Ser. No. 256,250, Oct. 11, 1988, abandoned, which is a continuation of Ser. No. 893,615, Aug. 6, 1986, abandoned.

[30] Foreign Application Priority Data

Aug. 17, 1985 [DE] Fed. Rep. of Germany ....... 3529498

[51] Int. Cl.$^5$ ............................................. C08G 75/14
[52] U.S. Cl. .................................... 528/388; 525/537
[58] Field of Search ......................... 528/388; 525/537

[56] References Cited

U.S. PATENT DOCUMENTS

| | | | |
|---|---|---|---|
| 4,525,579 | 6/1985 | Idel et al. | 528/388 |
| 4,537,953 | 8/1985 | Kawakami et al. | 528/388 |
| 4,605,732 | 8/1986 | Heitz et al. | 528/388 |
| 4,608,433 | 8/1986 | Meyer et al. | 528/388 |
| 4,760,127 | 7/1988 | Ebert et al. | 528/388 |
| 4,820,800 | 4/1989 | Geibel et al. | 528/388 |

FOREIGN PATENT DOCUMENTS

| | | | |
|---|---|---|---|
| 3318401 | 11/1986 | Fed. Rep. of Germany | 528/388 |
| 221331 | 12/1984 | Japan | 528/328 |

*Primary Examiner*—John C. Bleutge
*Assistant Examiner*—Helen F. Lee
*Attorney, Agent, or Firm*—Connolly & Hutz

[57] ABSTRACT

The invention relates to a process for the preparation of optionally branched, high molecular weight polyarylene sulphides with melt viscosities which can be established at defined values and low corrosion.

These polyarylene sulphides are obtained by reacting alkali metal sulphides, if appropriate mixed with alkali metal bisulphides and reaction accelerators, with dihalogenoaromatics and, if appropriate, polyhalogenoaromatics, with the addition of particular monohalogenoaromatics as chain stoppers.

1 Claim, No Drawings

PROCESS FOR PREPARATION OF HIGH MOLECULAR WEIGHT, OPTIONALLY BRANCHED POLYARYLENE SULPHIDES

This application is a continuation of application Ser. No. 07/494,782 filed on Mar. 12, 1990, which is a continuation of application Ser. No. 256,250, filed Oct. 11, 1988, now abandoned, which is a continuation of application Ser. No. 893,615, filed Aug. 6, 1986, now abandoned.

The invention relates to a process for the preparation of high molecular weight, optionally branched polyarylene sulphides from alkali metal sulphides, if appropriate mixed with alkali metal bisulphides, and dihalogenoaromatics in a polar solvent in the presence of 0.1 to 5.0 mol %, preferably 0.25 to 3.0 mol %, of an aromatic monohalogen compound. The polyarylene sulphides thus obtained have defined melt viscosities and are distinguished by low corrosion.

Polyarylene sulphides and their preparation are known, see, for example, U.S. Pat. Nos. 2,513,188, 3,117,620 and 3,354,129.

It is thus known, for example, that the addition of inorganic or organic salts to the reaction mixture contributes to reducing the melt flow or increasing the melt viscosity of the polyphenylene sulphides obtained. Only if they have a sufficiently high melt viscosity can polyphenylene sulphides be processed as thermoplastics, for example to injection-moulded components, films and fibers. Without the addition of the abovementioned salts, polyphenylene sulphides which achieve the necessary low melt flow only via a separate and additional after-condensation or hardening (curing) are obtained.

It is known to add, as salts, for example, alkali metal carboxylates (DE-AS (German Published Specification) 2,453,749), lithium halides or alkali metal carboxylates (DE-OS (German Published Specification) 2,623,362), lithium chloride or lithium carboxylate (DE-OS (German Published Specification) 2,623,363), alkali metal carbonates in combination with alkali metal carboxylates (U.S. Pat. No. 4,038,259), lithium acetate (DE-OS (German Published Specification) 2,623,333), tri-alkali metal phosphates (DE-OS (German Published Specification) 2,930,710), tri-alkali metal phosphonates (DE-OS (German Published Specification) 2,930,797), alkali metal fluorides (DE-OS (German Published Specification) 3,019,732), alkali metal sulphonates (U.S. Pat. No. 4,038,260), lithium carbonate and lithium borate (U.S. Pat. No. 4,030,518).

Obtaining polyarylene sulphides with high melt viscosities by addition of N,N-dialkylcarboxylic acid amides to the reaction mixture and the use of polar solvents for the preparation are furthermore known from DE-OS (German Published Specification) 3,120,538.

It has now been found that, by adding certain aromatic monohalogen compounds to the reaction mixture, polyarylene sulphides which have melt viscosities which can be obtained in a reproducible manner and are distinguished by low corrosion during processing have been obtained.

The invention therefore relates to a process for the preparation of optionally branched polyarylene sulphides from a) 50–100 mol % of dihalogenoaromatics of the formula

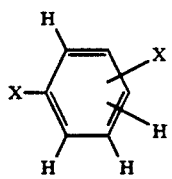

and 0–50 mol % of dihalogenoaromatics of the formula

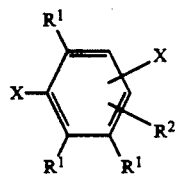

in which

X represents halogen in the meta- or paraposition relative to one another, such as chlorine or bromine, and $R^1$ and $R^2$ is identical or different and can be hydrogen, $C_1$–$C_4$-alkyl, $C_5$–$C_{10}$-cycloalkyl, $C_6$–$C_{10}$-aryl, $C_7$–$C_{10}$-alkylaryl or $C_7$–$C_{14}$-arylalkyl, it being possible for two radicals $R^1$ in the ortho-position relative to one another to be linked to form an aromatic ring or a heterocyclic ring containing up to three hetero atoms, such as N, O, S, and one radical $R^1$ always being other than hydrogen, and b) 0–5 mol %, preferably 0.1–2.5 mol %, based on the sum of the dihalogenoaromatics of the formula I and II, of a tri- or tetrahalogenoaromatic of the formula $$ArX_n \qquad (III)$$

wherein

Ar is an aromatic $C_6$–$C_{14}$ radical or a heterocyclic radical with 5 to 14 ring atoms, it being possible for up to 3 ring C atoms to be replaced by hetero atoms, such as N, O or S, X represents halogen, such as chlorine or bromine, and n represents the number 3 or 4, and c) 50 to 100 mol % of an alkali metal sulphide, preferably sodium sulphide or potassium sulphide or a mixture thereof, for example in the form of their hydrates or aqueous mixtures, if appropriate together with small amounts of alkali metal hydroxides, such as sodium hydroxide or potassium hydroxide, and 0 to 50 mol % of an alkali metal bisulphide, preferably sodium bisulphide and potassium bisulphide, or a mixture thereof, it being possible for the molar ratio of (a+b):c to be in the range from 0.75:1 to 1.25:1, d) if appropriate in the presence of reaction accelerators, such as alkali metal carboxylates, alkali metal phosphates, alkali metal phosphonates, alkali metal fluorides or alkali metal alkylsulphonates, if appropriate in the presence of N,N-dialkylcarboxylic acid amides, lactams, aminoacids, anhydrides and esters of carboxylic acids, characterized in that monohalogenoaromatics of the formula IV $$W—A—R \qquad (IV)$$

wherein

W represents halogen, such as Cl, Br or I, or a sulphonic acid radical, such as mesylate or tosylate, preferably Cl or Br, A is an aromatic or heterocyclic radical with 6 to 24 C atoms and 0 to 3 hetero atoms, such as N, O or S, for example

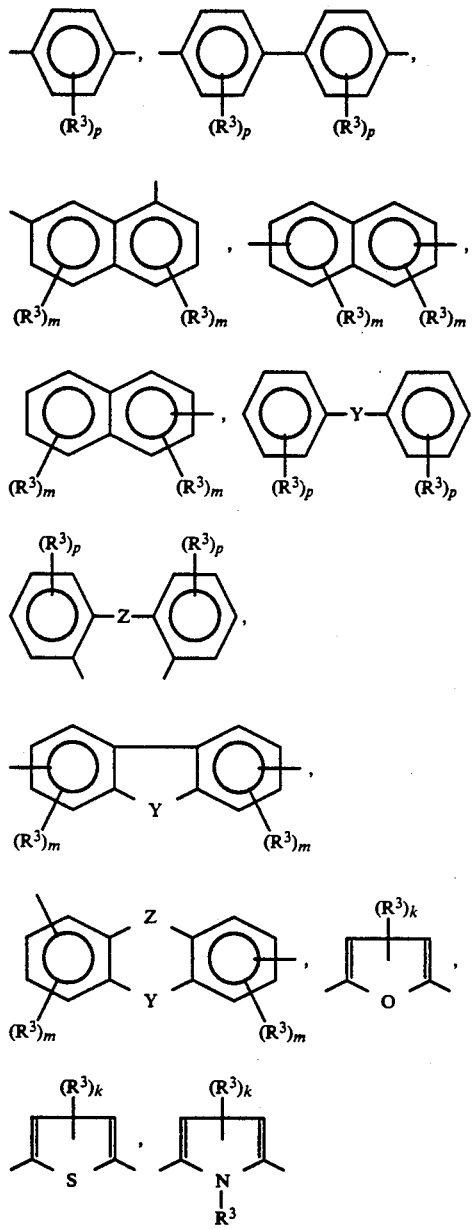

wherein the radicals $R^3$ independently of one another are $C_1$-$C_8$-alkyl, $C_7$-$C_{19}$-alkaryl/aralkyl or $C_3$-$C_6$-cycloalkyl, Z represents $C_1$-$C_6$-alkylidene, $C_2$-$C_6$-cycloalkylidene, CO, —S—, —SO—, —SO$_2$—, O or a single bond, Y represents O, $NR^3$, (wherein $R^3$ has the abovementioned meaning), S, $SO_2$ or CO, k represents the number 0, 1 or 2, m represents the number 0, 1, 2 or 3, p represents the number 0, 1, 2, 3 or 4 and R has the meaning given for $R^3$, are added to the reaction mixture in amounts of 0.1 mol %-5 mol %, preferably 0.25 mol %-3.0 mol %.

The process according to the invention can be carried out in various ways:

The alkali metal sulphides are preferably used in the form of their hydrates and aqueous mixtures or solutions. Dehydration may be partial, but is preferably complete. The water present in the reaction mixture is distilled out of the mixture. Distillation of the water can be carried out directly or with the aid of agents which form azeotropes, the dihalogenoaromatics preferably being used as agents which form azeotropes. For the dehydration, all the reaction partners can be mixed and dehydration of the entire mixture can be carried out. The alkali metal sulphide can also be dehydrated separately with some of the reaction components or by itself.

In one embodiment of the reaction, the reaction partners are brought together continuously with the reaction accelerator or a mixture of reaction accelerators in the presence of the polar solvent, the water being simultaneously removed. In this procedure, a reaction which has started can be controlled via the metering rates. Longer residence times of the water can thus also be avoided.

If dehydration is complete, the reaction can be carried out under normal pressure or under a low pressure of up to about 3 bar. To achieve higher reaction temperatures above the boiling point of the solvent or of the mixture of solvent and di- and polyhalogenoaromatics, a higher pressure of up to 50 bar can be applied.

The reaction can be carried out continuously or batchwise. The reaction time can be varied within a wide range. It can be 1 to 48 hours, preferably 1 to 18 hours. The reaction temperatures are between 150° C. and 300° C., preferably between 170° C. and 280° C.

The monohalogenoaromatics as chain stoppers of the formula IV can be added before or during the reaction. Mixtures of the monohalogenoaromatics can thereby also be employed. Addition can be via metering over a certain period of time of the reaction, in portions at certain times in the course of the reaction or by direct addition of the calculated total amount at a defined point in time of the reaction.

The polyarylene sulphides prepared according to the invention are distinguished by defined melt viscosities which can be reproduced within a narrow range. This is of great importance inasmuch as polymer melts which have different flow properties and which must be adapted to suit the particular intended use must be established for processing of the polyarylene sulphides.

Thus, higher melt viscosities are necessary for the production of films and fibres than for making injection-moulded components reinforced with glass fibres or glass fibres/mineral.

Another advantage of the polyarylene sulphides according to the invention is the higher stability under exposure to heat. Only in this way is it ensured that no further build-up or degradation, which can lead to a complete change in the pattern of properties, occurs during thermoplastic processing and regenerated material can be re-used again after processing.

The corrosion which generally occurs during thermoplastic processing or on contact of PPS melts with metal surfaces and which leads to impurities in the PPS and to wear on processing machines is moreover fortunately also greatly reduced in the polyarylene sulphides according to the invention, even under severe exposure to heat.

The reaction mixture can be worked up and the polyarylene sulphides isolated in a known manner.

The polyarylene sulphide can be separated off directly from the reaction solution or, for example, after first adding water and/or dilute acids or organic solvents with a low solubility for polyarylene sulphides, by the customary procedures, for example by filtration or by centrifugation. After the polyarylene sulphides have been separated off, they are in general subsequently washed with water. Washing or extraction with other washing liquids, which can also be carried out in addition to or after this washing, is also possible.

The polyarylene sulphides can also be obtained, for example, by distilling off the solvent and subsequent washing, as described above.

The alkali metal sulphides can also be obtained, for example, from H₂S and the alkali metal hydroxides or from the bisulphides and alkali metal hydroxides.

Depending on the amount of alkali metal bisulphide in the alkali metal sulphide, certain amounts of alkali metal hydroxide can also additionally be metered in. If appropriate, those compounds which split off or form alkali metal hydroxides under the reaction conditions can also be added instead of the alkali metal hydroxides.

Meta- and para-dihalogenoaromatics of the formula (I) or (II) can be employed according to the invention. In this case, the ratio of meta- to para-dihalogenoaromatic can be up to 30:70.

p-Dihalogenoaromatics are preferably employed to obtain polyphenylene sulphides which can be processed as thermoplastics.

If branched polyarylene sulphides are to be prepared, at least 0.05 mol % of a tri- or tetrahalogenoaromatic of the formula (III) should be employed.

Examples of dihalogenoaromatics of the formula (I) which are to be employed according to the invention are: p-dichlorobenzene, p-dibromobenzene, 1-chloro-4-bromobenzene, 1,3-dichlorobenzene, 1,3-dibromobenzene and 1-chloro-3-bromobenzene. They can be used by themselves or as a mixture with one another. 1,4-Dichlorobenzene and/or 1,4-dibromobenzene are particularly preferred.

Examples of dihalogenoaromatics of the formula (II) which are to be employed according to the invention are: 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,5-dichlorobenzene, 1-cyclohexyl-2,5-dichlorobenzene, 1-phenyl-2,5-dichlorobenzene, 1-benzyl-2,4-dichlorobenzene, 1-phenyl-2,5-dibromobenzene, 1-p-tolyl-2,5-dichlorobenzene, 1-p-tolyl-2,5-dibromobenzene, 1-hexyl-2,5-dichlorobenzene, 2,4-dichlorotoluene, 2,4-dichloroxylene, 2,4-dibromocumene and 1-cyclohexyl-3,5-dichlorobenzene. They can be employed by themselves or as a mixture with one another.

Examples of tri- or tetrahalogenoaromatics of the formula (III) which are to be employed according to the invention are: 1,2,3-trichlorobenzene, 1,2,4-trichlorobenzene, 1,2,4-tribromobenzene, 1,3,5-trichloro-2,4,5-trimethylbenzene, 1,2,3-trichloronaphthalene, 1,2,4-trichloronaphthalene, 1,2,6-trichloronaphthalene, 2,3,4-trichlorotoluene, 2,3,6-trichlorotoluene, 1,2,3,4-tetrachloronaphthalene, 1,2,4,5-tetrachlorobenzene, 2,2'-4,4'-tetrachlorobiphenyl and 1,3,5-trichlorotriazine.

In general, any polar solvent which guarantees a sufficient solubility of the organic and, if appropriate, inorganic reactants under the reaction conditions can be employed for the reaction. N-Alkyllactams are preferably used.

N-Alkyllactams are those of amino acids with 3-11 C atoms, which can optionally carry substituents which are inert under the reaction conditions on the carbon skeleton.

Examples of N-alkyllactams which can be used are: N-methylcaprolactam, N-ethylcaprolactam, N-isopropylcaprolactam, N-isobutylcaprolactam, N-propylcaprolactam, N-butylcaprolactam, N-cyclohexylcaprolactam, N-methyl-2-pyrrolidone, N-ethyl-2-pyrrolidone, N-isopropyl-2-pyrrolidone, N-isobutyl-2-pyrrolidone, N-propyl-2-pyrrolidone, N-butyl-2-pyrrolidone, N-cyclohexyl-2-pyrrolidone, N-methyl-3-methyl-2-pyrrolidone, N-cyclohexyl-2-pyrrolidone, N-methyl-3-methyl-2-pyrrolidone, N-methyl-3,4,5-trimethyl-2-pyrrolidone, N-methyl-2-piperidone, N-ethyl-2-piperidone, N-isobutyl-2-piperidone, N-methyl-6-methyl-2-piperidone and N-methyl-3-ethyl-2-piperidone.

Mixtures of the above solvents can be chosen.

Monohalogenoaromatics or heterocyclic compounds which can be employed according to the invention are, for example: 3-chlorodiphenyl, 4-chlorodiphenyl, 3-bromodiphenyl, 4-chlorodiphenyl, 2-chlorodiphenyl ether, 4-chlorodiphenyl ether, 2-bromodiphenyl ether, 4-bromodiphenyl ether, 2-chlorodiphenyl sulphide, 3-chlorodiphenyl sulsulphide, 4-chlorodiphenyl sulphide, 2-bromodiphenyl sulphide, 3-bromodiphenyl sulphide, 4-bromodiphenyl sulphide, 2-chlorodiphenyl-sulphoxide, 4-chlorodiphenyl sulphoxide, 2-bromodiphenyl-sulphoxide, 4-bromodiphenyl sulphoxide, 2-chlorodiphenyl sulphone, 3-chlorodiphenyl sulphone, 4-chlorodiphenyl sulphone, 2-bromodiphenyl sulphone, 3-bromodiphenyl sulphone, 4-bromodiphenyl sulphone, (4-chlorophenyl)phenylmethane, 2-(4-chlorophenyl)-2-phenylpropane, 2-(4-chloro-3,5-dimethylphenyl)-2-phenyl-propane, (4-bromophenyl)phenylmethane, 2-(4-bromophenyl)-2-phenylpropane, 2-(4-bromo-3,5-dimethylphenyl)-2-phenyl-propane, 1-chloronaphthalene, 2-chloronaphthalene, 1-bromonaphthalene, 2-bromonaphthalene, 2-chlorofuran, 2-chloropyrrole, 2-chlorothiophene, 2-bromofuran, 2-bromopyrrole, 2-bromothiophene, 3-chlorophenyl phenyl ketone, 4-chlorophenyl phenyl ketone, 3-bromophenyl phenyl ketone and 4-bromophenyl phenyl ketone.

3-Chlorodiphenyl, 3-bromodiphenyl, 4-chlorodiphenyl, 4-bromodiphenyl, 3-chlorodiphenyl sulphide, 3-bromodiphenyl sulphide, 4-chlorodiphenyl sulphide, 4-bromodiphenyl sulphide, 3-chlorodiphenyl sulphone, 3-bromodiphenyl sulphone, 4-chlorodiphenyl sulphone, 4-bromodiphenyl sulphone, 3-chlorophenyl ketone, 3-bromophenyl phenyl ketone, 4-chlorophenyl phenyl ketone and 4-bromophenyl phenyl ketone are preferably employed.

If appropriate, the reaction can additionally be carried out in the presence of customary reaction accelerators, such as, for example: alkali metal carboxylates (DE-AS (German Published Specification) 2,453,749), lithium halides or alkali metal carboxylates (DE-OS (German Published Specification) 2,623,362), lithium chloride or lithium carboxylate (DE-OS (German Published Specification) 2,623,363), alkali metal carbonates in combination with alkali metal carboxylates (U.S. Pat. No. 4,038,259), lithium acetate (DE-OS (German Published Specification) 2,623,333), tri-alkali metal phosphates (DE-OS (German Published Specification) 2,930,710), trialkali metal phosphonates (DE-OS (German Published Specification) 2,930,797), alkali metal fluorides (DE-OS (German Published Specification) 3,019,732), alkali metal sulphonates (U.S. Pat. No. 4,038,260), lithium carbonate and lithium borate (U.S. Pat. No. 4,010,518), amino acids (DE-OS (German Published Specification) 3,428,984), defined amounts of lactam (DE-OS (German Published Specification) 3,432,985), anhydrides and esters of carboxylic acids (DE-OS (German Published Specification) 3,432,986) and N,N-dialkylcarboxylic acid amides.

The polyarylene sulphides according to the invention can be mixed with other polymers, such as pigments and fillers—for example graphite, metallic powders, glass powders, quartz flour, glass fibres or carbon fibres—or the additives customary for polyarylene sulphides, for example customary stabilizers or mould release agents, can be added.

The melt flow properties of polyarylene sulphides are in general measured in accordance with ASTM 1238-70 at 316° C. using a 5 kg weight and are stated in g/10 minutes.

However, if the melt flow values are high, this measurement can present difficulties because of the high discharge rate of the polymer melt.

The melt viscosity $\eta m$ of the polymer melt (in Pa.s) at 306° C. as a function of the shearing stress (in Pa) was therefore determined with the aid of an Instron rotary viscometer.

The melt viscosity can be determined within a very wide range of from $10^{-1}$ to $10^7$ Pa.s in this manner. In the Instron rheometer, the polymer is melted between a fixed plate and a rotatable cone and the torque of the cone is determined. From the torque, the angular velocity and the apparatus data, the melt viscosity can be calculated as a function of the shearing stress. The rheometer model 3250 from Instron was used, diameter of the cone and of the plate 2 cm. The melt viscosity measured at a shearing stress of $\tau = 10^2$ Pa is stated.

After being isolated from the reaction mixture, the polyarylene sulphides according to the invention have melt viscosities of between 1 and $5 \times 10^3$, preferably of 5 to $10^3$ Pa.s. They can be processed in the customary manner. Films, fibres and, preferably, injection moulding compositions are thereby obtained. These can be used, for example, as automobile components, fittings, electrical components, for example switches, electronic boards, components and apparatuses which are resistant to chemicals and stable to weathering, such as pump housings and pump impellers, etching bath dishes, sealing rings and components of office machines and communications equipment, and as domestic appliances, valves, ball bearing components, embedding compositions for electronic components etc.

Polyarylene sulphides can be analysed by chromatographic processes to provide information on their molecular weight and molecular weight distribution. High pressure liquid chromatography (HPLC) or gel permeation chromatography (GPC), for example, are suitable for this.

The customary carrier materials, such as, for example, Li-Chroprep ®, Lobar ®, Li-Chrosorb ®, Li-Chrospher ®, Perisorb ®, Hibar ®, Fractogel ®, Ultra-styragel ®, Microstyragel ®, Zorbax ®, Bondagel ® and Shodex ®, can be used as the stationary phase.

The customary solvents can be used as solvents and mobile phases. These should dissolve the polymers sufficiently.

Examples of suitable solvents are 1-chloronaphthalene, diphenyl, N-methylpyrrolidone, N-cyclohexylpyrrolidone, N-methylpiperidone, N-methylcaprolactam, N-methyllaurolatram, sulpholane, N,N'-dimethylimidazolidinone, N,N'-dimethylpiperazinone, hexamethylphosphoric acid triamide, 1-methyl-1-oxo-phospholane and mixtures thereof.

Absolute or relative calibrations can be carried out with the chromatographic analytical methods. Examples of suitable calibration substances for relative are customary polymers, such as, for example, polystyrene, polyethylene, polyethylene terephthalate, polybutylene terephthalate, polyesters, such as purely aromatic polyesters, polycarbonate, polyamides, such as PA 6, PA 66 and PA 11, polysulphones or polyether-sulphones.

The chromatography for analytical determination of the molecular weights or molecular weight distribution can be applied at various pressures from 1 to 10 bar.

The chromatographic determination is carried out at a temperature from room temperature to 250° C.

Substances such as alkali metal halides, alkaline earth metal carboxylates and phosphonium or ammonium compounds can furthermore be added to the sample to be analysed in order to improve the measurement accuracy.

The weight-average molecular weight $M_w$ can be stated in the evaluation of the analytical data thus obtained. These are 15,000 to 150,000, preferably 15,000 to 100,000.

EXAMPLES

EXAMPLE 1

This example describes, for comparison, the preparation of polyphenylene sulphide according to U.S. Pat. No. 3,354,129, 1,2,4-trichlorobenzene being metered in as a branching agent to increase the melt viscosity.

129 g of sodium sulphide tri-hydrate (corresponding to 1 mole of Na$_2$S) and 300 g of N-methyl-2-pyrrolidone were brought together in an autoclave equipped with stirring. The mixture was flushed with nitrogen and warmed slowly up to 202° C. A total of 19 ml of water thereby distilled off. The mixture was then cooled down to about 160° C. and 147 g of p-dichlorobenzene (=1 mole) and 1.81 g, of 1,2,4-trichlorobenzene (1 mol %, based on the number of moles of p-dichlorobenzene) in about 50 g of N-methyl-2-pyrrolidone were added. The reaction mixture is warmed to 245° C. under a preliminary nitrogen pressure of 2.5 bar in the course of 30 minutes, during which the pressure rises to 10 bar, and this temperature is maintained for 3 hours. After cooling to room temperature, a grey solid is isolated and is subsequently subjected to thorough washing with water to remove inorganic concomitant materials.

The product is dried at 80° C. in vacuo to give 100.3 g (93%) of poly-p-phenylene sulphide with a melt viscosity of 20 Pa.s (measured at $10^2$ Pa and 306° C.).

EXAMPLE 2

756.75 g of sodium sulphide hydrate (about 60% strength), 135 g of 2.5% strength sodium hydroxide solution and 108 g of caprolactam were metered into 2,100 g of N-methylcaprolactam and 940.8 g of p-dichlorobenzene at a temperature of 220° C.

The rate of metering in depends on the conversion and is adjusted so that the temperature of 220° C. can be maintained, with simultaneous additional heating of the reaction vessel. During the metering, the water is simultaneously removed from the reaction.

After the metering, the reaction is kept under reflux for a further 4 hours and 24.3 g of p-chlorodiphenyl sulphone in 50 ml of N-methylcaprolactam are then metered in. After a further reaction time of 3 hours, the PPS is precipitated in water, washed until free from electrolytes and briefly extracted with an organic solvent. The dried p-polyphenyl sulphide has a melt viscosity of 45 Pa.s (measured at $10^2$ Pa and 306° C.).

EXAMPLE 3

The procedure is as for Example 2, but the p-chlorodiphenyl sulphone is metered in after only 2 hours 30 minutes. The resulting p-polyphenylene sulphide has a melt viscosity of 15 Pa.s (measured at $10^2$ Pa and 306° C.).

EXAMPLE 4

The procedure is as for Example 2, but with methyloxophospholane as the solvent. A p-polyphenylene sulphide with a melt viscosity of 60 Pa.s (measured at $10^2$ Pa and 306° C.) is obtained.

EXAMPLE 5

The procedure is as for Example 3, but 10.1 g of p-chlorodiphenyl ether were added. A melt viscosity of 250 Pa.s (measured at $10^2$ Pa and 306° C.) is obtained.

EXAMPLE 6

The experiment from Example 2 was repeated 5 times. The same viscosity was always obtained with very good reproducibility within a narrow range of error (Table 1):

TABLE 1

| Sample 1 | $\eta_m = 51$ Pa.s (at $10^2$ Pa and 306° C.) |
|---|---|
| Sample 2 | $\eta_m = 47$ Pa.s |
| Sample 3 | $\eta_m = 46$ Pa.s |
| Sample 4 | $\eta_m = 50$ Pa.s |
| Sample 5 | $\eta_m = 46$ Pa.s |

EXAMPLE 7

The procedure is as for Example 2, but instead of being added during the after-condensation period, 32.4 g (2 mol %) of 4-chlorodiphenyl sulphone were taken initially. The polyphenylene sulphide obtained after working up has a melt viscosity of $\eta_m = 13$ Pa.s (at $\tau = 10^2$ Pa and 306° C.

EXAMPLE 8

The procedure is as for Example 7, but 24.3 g (1.5 mol %) of 4-chlorodiphenyl sulphone are taken initially. The polyphenylene sulphide thus obtained has a melt viscosity of $\eta_m = 32$ Pa.S (at $\tau = 10^2$ Pa and 306° C.).

EXAMPLE 9

The procedure is as for Example 7, but 16.2 g (1.0 mol %) of 4-chlorodiphenyl sulphone are taken initially. The polyphenylene sulphide isolated has achieved a melt viscosity of $\eta_m = 63$ Pa.s (at $\tau = 10^2$ Pa and 306° C.).

EXAMPLE 10

Example 9 was repeated. A polyphenylene sulphide with $\eta_m = 66$ Pa.s (at $\tau = 10^2$ Pa and 306° C.) was obtained.

EXAMPLE 11

The procedure is as for Example 7, but 12.15 g (0.75 mol %) of 4-chlorodiphenyl sulphone are taken initially. A polyphenylene sulphide with a melt viscosity of $\eta_m = 80$ Pa.s (at $\tau = 10^2$ Pa and 306° C.) is obtained with this procedure.

EXAMPLE 12

The procedure is as for Example 7, but 8.1 g (0.5 mol %) of 4-chlorodiphenyl sulphone are taken initially. The polyphenylene sulphide thus obtained has a melt viscosity of $\eta_m = 145$ Pa.s (at $\tau = 10^2$ Pa and 306° C.).

EXAMPLE 13

The procedure is as for Example 8, but the reaction was carried out with N-butylcaprolactam instead of N-methylcaprolactam as the solvent. The polyphenylene sulphide has a melt viscosity of $\eta_m = 34$ Pa.s (at $\tau = 10^2$ Pa and 306° C.).

Corrosion

The corrosion was determined by titration of acid gaseous emissions from the corresponding polyphenyl sulphide samples in a stream of air at 350° C. in the course of 1 hour. The corrosion factor f=

| Corrosion of the corresponding example Corrosion of Comparison Example 1 | |
|---|---|
| Example | f |
| 2 | 0.89 |
| 3 | 0.92 |
| 4 | 0.90 |
| 5 | 0.85 |
| 7 | 0.92 |
| 8 | 0.90 |
| 9 | 0.85 |
| 11 | 0.92 |
| 12 | 0.91 |

We claim:

1. In the process for the preparation of branched or unbranched polyarylene sulphides which comprises reacting:

a) 50–100 mol % of dihalogenoaromatics of the formula

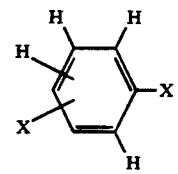

(I)

and 0–50 mol % of dihalogenoaromatics of the formula

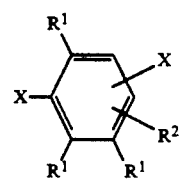

(II)

in which

X represents halogen in the meta- or para-position relative to one another, and

R$^1$ and R$^2$ is identical or different and is hydrogen, C$_1$–C$_4$-alkyl, C$_5$–C$_{10}$-cycloalkyl, C$_6$–C$_{10}$-aryl, C$_7$–C$_{10}$-alkylaryl or C$_7$–C$_{14}$-aralkyl, or two radicals R$^1$ in the ortho-position relative to one another linked to form an aromatic ring or a heterocyclic ring containing up to three hetero atoms, and wherein one radical R$^1$ is always other than hydrogen, b) 0–5 mol %, based on the sum of the dihalogenoaromatics of the formula I and II, of a tri- or tetrahalogenoaromatic of the formula $$ArX_n \qquad (III)$$

wherein

Ar is an aromatic C$_6$–C$_{14}$ radical or a heterocyclic radical with 5 to 14 ring atoms with up to 3 ring carbon atoms replaced by hetero atoms, X represents halogen, and n represents the number 3 or 4, and c) 50 to 100 mol % of an alkali metal sulphide or alkali metal sulphide with or without alkali metal hydroxide, and 0 to 50 mol % of an alkali metal bisulphide with the molar ratio of (a+b):c in the range from 0.75:1 to 1.25:1, wherein the improvement comprises adding to the reaction 0.1 to 5 mol % of monochlorodiphenyl sulfone.

* * * * *